(12) United States Patent
Takahashi et al.

(10) Patent No.: US 8,257,026 B2
(45) Date of Patent: Sep. 4, 2012

(54) EXPANSION TURBINE

(75) Inventors: Toshio Takahashi, Tokyo (JP); Seiichiro Yoshinaga, Tokyo (JP); Hirohisa Wakisaka, Chigasaki (JP)

(73) Assignee: IHI Corporation (JP)

( * ) Notice: Subject to any disclaimer, the term of this patent is extended or adjusted under 35 U.S.C. 154(b) by 1342 days.

(21) Appl. No.: 12/054,880

(22) Filed: Mar. 25, 2008

(65) Prior Publication Data

US 2009/0028693 A1    Jan. 29, 2009

(30) Foreign Application Priority Data

Mar. 30, 2007 (JP) ................. P2007-095447

(51) Int. Cl.
*F01D 15/12* (2006.01)
*F01D 25/12* (2006.01)

(52) U.S. Cl. .................. 415/123; 415/175; 415/178

(58) Field of Classification Search .............. 415/108, 415/123, 175, 178; 310/49.34, 49.36, 105; 188/267
See application file for complete search history.

(56) References Cited

U.S. PATENT DOCUMENTS

| | | | |
|---|---|---|---|
| 2,606,948 A * | 8/1952 | Jaeschke | 307/105 |
| 2,922,056 A * | 1/1960 | Jaeschke | 310/93 |
| 3,303,368 A * | 2/1967 | Cohen et al. | 310/105 |
| 3,363,123 A * | 1/1968 | Jaeschke | 310/105 |
| 3,372,292 A | 3/1968 | Lynch et al. | |
| 4,234,809 A * | 11/1980 | Burenkov et al. | 310/105 |
| 4,242,609 A * | 12/1980 | Burenkov et al. | 310/105 |
| 2004/0090295 A1 | 5/2004 | Yajima et al. | 335/229 |

FOREIGN PATENT DOCUMENTS

| | | |
|---|---|---|
| CZ | 244628 | 10/1987 |
| CZ | 278341 B6 * | 11/1993 |
| FR | 2 518 688 | 6/1983 |
| JP | Y-41-013137 | 6/1966 |
| JP | Y-41-013138 | 6/1966 |
| JP | S-48-43047 | 6/1973 |

(Continued)

OTHER PUBLICATIONS

Japanese Office Action dated Sep. 6, 2011 in corresponding Japanese Patent Application No. 2007-095447 (with English translation).

(Continued)

*Primary Examiner* — Edward Look
*Assistant Examiner* — Jason Davis
(74) *Attorney, Agent, or Firm* — Ostrolenk Faber LLP (57) ABSTRACT

A braking mechanism is provided that is suitable for an expansion turbine that rotates at high speed. Upper end salient poles 26a and 26b are formed in two opposite places on the outer peripheral upper end of a rotating shaft 12, and lower end salient poles 28a and 28b are formed in two opposite places on the outer peripheral lower end of the rotating shaft 12 such that they are staggered in the vertical direction with respect to the upper end salient poles 26a and 26b. A casing 22 is provided in a location facing an outer periphery of the rotating shaft 12, and an excitation coil 30 is provided on the casing 22 for forming a magnetic path between the upper end salient poles 26a and 26b and the lower end salient poles 28a and 28b. By rotation of the rotating shaft 12, and by the magnetic path formed by the excitation coil 30, eddy currents are generated in the casing 22.

14 Claims, 4 Drawing Sheets

FOREIGN PATENT DOCUMENTS

| | | |
|---|---|---|
| JP | Y-49-019750 | 5/1974 |
| JP | A-49-064779 | 6/1974 |
| JP | S-50-121145 | 10/1975 |
| JP | B-52-030669 | 8/1977 |
| JP | S-59-30686 | 2/1984 |
| JP | 60-228708 | 11/1985 |
| JP | 01-288636 | 11/1989 |
| JP | A-05-089802 | 12/1993 |
| JP | 06-137101 | 5/1994 |
| JP | 08-310356 | 11/1996 |
| JP | 2001-132410 | 5/2001 |
| JP | 2003-120210 | 4/2003 |
| JP | A-2005-080477 | 3/2005 |
| JP | 2005-218263 | 8/2005 |

OTHER PUBLICATIONS

Notice of Allowance dated Dec. 20, 2011 issued in corresponding Japanese Patent Application No. 2007-095447 with English translation. (6 pages).

European Search Report dated Jun. 13, 2012.

* cited by examiner

EXPANSION TURBINE

BACKGROUND OF THE INVENTION

1. Field of the Invention

The present invention relates to an expansion turbine provided with a mechanism for braking using eddy currents.

Priority is claimed on Japanese Patent Application No. 2007-95447, filed Mar. 30, 2007, the content of which is incorporated herein by reference.

2. Description of Related Art

Heretofore, in order to improve the thermal efficiency of refrigerating machines, expansion turbines have been used (for example, refer to Patent Document 1). As a method of braking the rotation of an expansion turbine for ultra low temperatures, there are known a hydraulic braking method and an electromagnetic braking method. As the hydraulic braking method, there are one using blower braking (for example, refer to Patent Document 2), and one using working fluid (for example, refer to Patent Document 3). As the electromagnetic braking method, one using a generator (for example, refer to Patent Document 4) is known.

Furthermore, as a method of braking the rotation of a rotating machinery in the vehicle field and the like, one using braking by eddy currents (for example, refer to Patent Document 5) is known. In this method, a principle is adapted whereby eddy currents are generated on the surface of the rotor by, supplying an electric current through a coil provided on the static side (stator) to generate a magnetic field, and inducing a magnetic field in the rotating rotor. The arrangement is such that an electromagnetic force is generated in the opposite direction to the direction of rotation by the vector product of these eddy currents and the magnetic flux, and it is used as a braking torque.

[Patent Document 1] Japanese Unexamined Patent Application, First Publication No. S60-228708

[Patent Document 2] Japanese Unexamined Patent Application, First Publication No. H 6-137101

[Patent Document 3] Japanese Unexamined Patent Application, First Publication No. H 8-310356

[Patent Document 4] Japanese Unexamined Patent Application, First Publication No. 2001-132410

[Patent Document 5] Japanese Unexamined Patent Application, First Publication No. H1-288636

Incidentally, since the method of blower braking among the above-described conventional expansion turbine braking methods is a mechanical structure, although the braking action is reliable, because it involves the flow of fluid, the flow of gas cannot be cut off completely. As a result, there is a concern about a drop in the turbine efficiency due to heat leakage to the blower side.

Furthermore, since a braking method using the generation of electrical energy involves high speed rotation, it requires an inverter for generation, and because the equipment for the braking resistance and for power regeneration when electrical energy is recovered and discharged by the inverter becomes correspondingly complicated, the control of the equipment also becomes complicated and expensive. Moreover, in the control method using the generation of electrical energy, there is a problem in that if the rotation conditions of a motor are not satisfied, the braking force is not exhibited.

Furthermore, as a braking method of rotating machines other than those in the above-described field of expansion turbines, for example a braking method using the mechanical friction of brake pads as used in the vehicle industry and the like is known. However, it is difficult to use this for the braking of a rotating body (rotor) that rotates at high speed as in an expansion turbine because there is a concern of disturbing the balance of the rotating body, for example by the heat generated due to friction loss, or losing balance due to contact.

Moreover, in the above-described conventional eddy current braking, since Joule heating is generated in the rotor due to the eddy currents, heat generation on the rotor side becomes prominent. In particular, in the case of high speed rotation via non-contact bearings, since there is no other method of removing heat than by gas or the like around the rotor, it is difficult to remove the heat on the rotor side. Furthermore, since the rotor is shaped such that it extends in the radial direction, such a shape is unsuitable for the braking of a high speed rotating body such as that in an expansion turbine. As a result, the development of an eddy current braking method has been required that has a simple, small, and inexpensive construction, in which a rotor can endure the centrifugal forces, and the rotating shaft stability is increased.

The present invention takes the above situation into consideration with an object of providing an expansion turbine in which heat generation on the rotor side can be suppressed, and also a braking torque can be obtained.

SUMMARY OF THE INVENTION

In an expansion turbine according to the present invention, the following method is employed in order to solve the above problems.

The present invention is an expansion turbine in which, when gas supplied to a turbine impeller provided on one end of a rotating shaft is adiabatically expanded, the turbine impeller rotates, wherein the construction is such that there are provided magnetic parts that create a difference in magnetic resistance in a circumferential direction, on an outer periphery of the rotating shaft at a side close to the turbine impeller and a side distant from the turbine impeller, and there is provided a casing having a coil that generates a magnetic flux when a current flows, in a location facing an outer periphery of the rotating shaft, such that eddy currents are generated in the casing by a magnetic path formed between the casing and the magnetic parts by the coil, and the rotation of the rotating shaft.

According to the present invention, since the magnetic parts that create a difference in magnetic resistance are provided on the outer periphery of the rotating shaft, both at the end close to the turbine impeller and the end distant from the turbine impeller in the circumferential direction, magnetic paths are formed that connect between the magnetic parts on the outer periphery of the rotating shaft at the end close to the turbine impeller and the casing facing them, and between the magnetic parts on the outer periphery of the rotating shaft at the end distant from the turbine impeller and the casing facing them. When a current flows through the coil, the flow of the magnetic flux is generated in the order, for example, from the end of the casing that is distant from the turbine impeller, to the magnetic parts on the outer periphery of the rotating shaft at the end distant from the turbine impeller, to the rotating shaft, to the magnetic parts on the outer periphery of the rotating shaft at the end close to the turbine impeller, to the end of the casing that is close to the turbine impeller (reverse order if either the winding direction of the coil or the excitation direction is changed). If the rotating shaft tries to rotate in this state, the magnetic flux density in the surroundings of the rotating shaft, in which the magnetic parts are provided, changes accompanying the rotation. Accordingly, eddy currents are generated on the surface of the casing located facing the magnetic parts.

By the generation of eddy currents, a braking force is generated opposing the direction of rotation of the rotating shaft. In this manner, since the construction is such that eddy currents are generated in the casing, little heat is electrically generated on the side of the rotating shaft.

Another expansion turbine according to the present invention is characterized in that in the above description, the magnetic parts comprise salient poles provided on the outer periphery of the rotating shaft at the end close to the turbine impeller and protruding towards the outside, and salient poles provided on the outer periphery of the rotating shaft at the end distant from the turbine impeller and protruding towards the outside.

According to the present invention, magnetic paths are formed between the salient poles provided on the outer periphery of the rotating shaft at the end close to the turbine impeller and protruding towards the outside, and the casing facing them, and between the salient poles provided on the outer periphery of the rotating shaft at the end distant from the turbine impeller and protruding towards the outside, and the casing facing them. When a current flows through the coil, the flow of the magnetic flux is generated in the order, for example, from the end of the casing that is distant from the turbine impeller, to the salient poles on the end distant from the turbine impeller, to the rotating shaft, to the salient poles on the end close to the turbine impeller, to the end of the casing that is close to the turbine impeller (reverse order if either the winding direction of the coil or the excitation direction is changed).

If the rotating shaft tries to rotate in this state, the magnetic flux densities in both of the surroundings of the rotating shaft in which the salient poles are provided change accompanying the rotation. Therefore, corresponding to this, eddy currents are generated on the salient poles and the surfaces of the casing located facing them.

Another expansion turbine according to the present invention is characterized in that in the above description, the difference in magnetic resistance is created by indented sections indented towards the inside, which are provided on the outer periphery of the rotating shaft at the ends both close to and distant from the turbine impeller.

According to the present invention, the difference in magnetic resistance in the circumferential direction is created by the indented sections on the outer periphery of the rotating shaft, which are indented towards the inside.

Another expansion turbine according to the present invention is characterized in that in the above description, the magnetic parts are two or more magnetic parts located at equal spacing around the circumferential direction of the rotating shaft.

According to the present invention, since two or more magnetic parts are located on the outer periphery of the rotating shaft at equal spacing in the circumferential direction, the stability of the rotating shaft as a rotator is increased.

Another expansion turbine according to the present invention is characterized in that in the above description, the magnetic parts are formed alternately such that they are staggered in the direction of an axis of rotation of the rotating shaft.

According to the present invention, since the magnetic parts are provided alternately shifted such that they are staggered in the direction of the axis of rotation, the stability of the rotating shaft as a rotator is further increased.

Another expansion turbine according to the present invention is characterized in that in the above description, the magnetic parts are integrated with the rotating shaft.

According to the present invention, since the rotating shaft and the magnetic parts are integrated into an integrated type shaft, the rigidity of the rotating shaft as a rotator is increased compared with the case where the rotating shaft and the magnetic parts are not integrated. As a result, in the case where the rotating shaft rotates at high speed, there is less concern about losing stability, such as disturbing the balance of the rotating shaft.

Another expansion turbine according to the present invention is characterized in that in the above description, the coil is provided in a location separated from the gas.

According to the present invention, since the coil is provided separated from the gas, there is no possibility of the coil making contact with the gas. Furthermore, when the coil is installed, there is no need to use special connectors such as hermetic connectors or the like to prevent gas leakage.

Another expansion turbine according to the present invention is characterized in that in the above description, a cooling water path is provided in the casing, which provides a cooling function, whereby the casing is cooled by water circulating through the cooling water path.

According to the present invention, heat generated in the casing is exhausted by the water flowing in the cooling water path provided in the casing, so that the casing is cooled by the water cooling system.

Another expansion turbine according to the present invention is characterized in that in the above description, the coil is provided in a location separated from the cooling water used for the cooling function.

According to the present invention, since the coil is separated from the cooling water, the coil does not make contact with the cooling water. Furthermore, when the coil is installed, there is no need to use special connectors such as hermetic connectors or the like to prevent water leakage.

Another expansion turbine according to the present invention is characterized in that in the above description: the magnetic parts are provided close to an inner peripheral surface of the casing; a thin cylindrical sleeve made of a nonmagnetic material is provided on an inner peripheral side of the casing, which faces an outer peripheral surface of the rotating shaft, between the ends of the rotating shaft, close to and distant from the turbine impeller, on which the magnetic parts are provided; the cooling water path is provided on an outer side of the sleeve; and the coil is provided outside of the casing separated from the cooling water path by a sealing part made of a nonmagnetic material, and a magnetic path is created between the casing and the magnetic parts by supplying a direct current through the coil, and braking of the rotating shaft is performed by generating eddy currents in the casing according to the rotation of the rotating shaft.

According to the present invention, eddy currents are generated in the casing by supplying a direct current through the coil to brake the rotating shaft. Heat generated in the casing is cooled by the cooling water in the cooling water path. The coil for generating magnetic flux is provided separated from the cooling water in the cooling water path and the gas, by the sealing part made of a nonmagnetic material. The cooling water path is provided in the casing, which is enclosed by the sleeve and the sealing part made of a nonmagnetic material.

EFFECTS OF THE INVENTION

According to the present invention, it is possible to provide a simple structure with high reliability that enables a rotating shaft (rotor) to be braked easily by only supplying current through a coil. Furthermore, since little heat is generated electrically on the rotating shaft side, the stability as a rotator is not impaired. Moreover, no special consideration is necessary in regards to the handling of the coil, which enables easy maintenance.

DETAILED DESCRIPTION OF THE INVENTION

Hereunder is a description of a first embodiment of an expansion turbine according to the present invention, with reference to the drawings.

Figure 1:
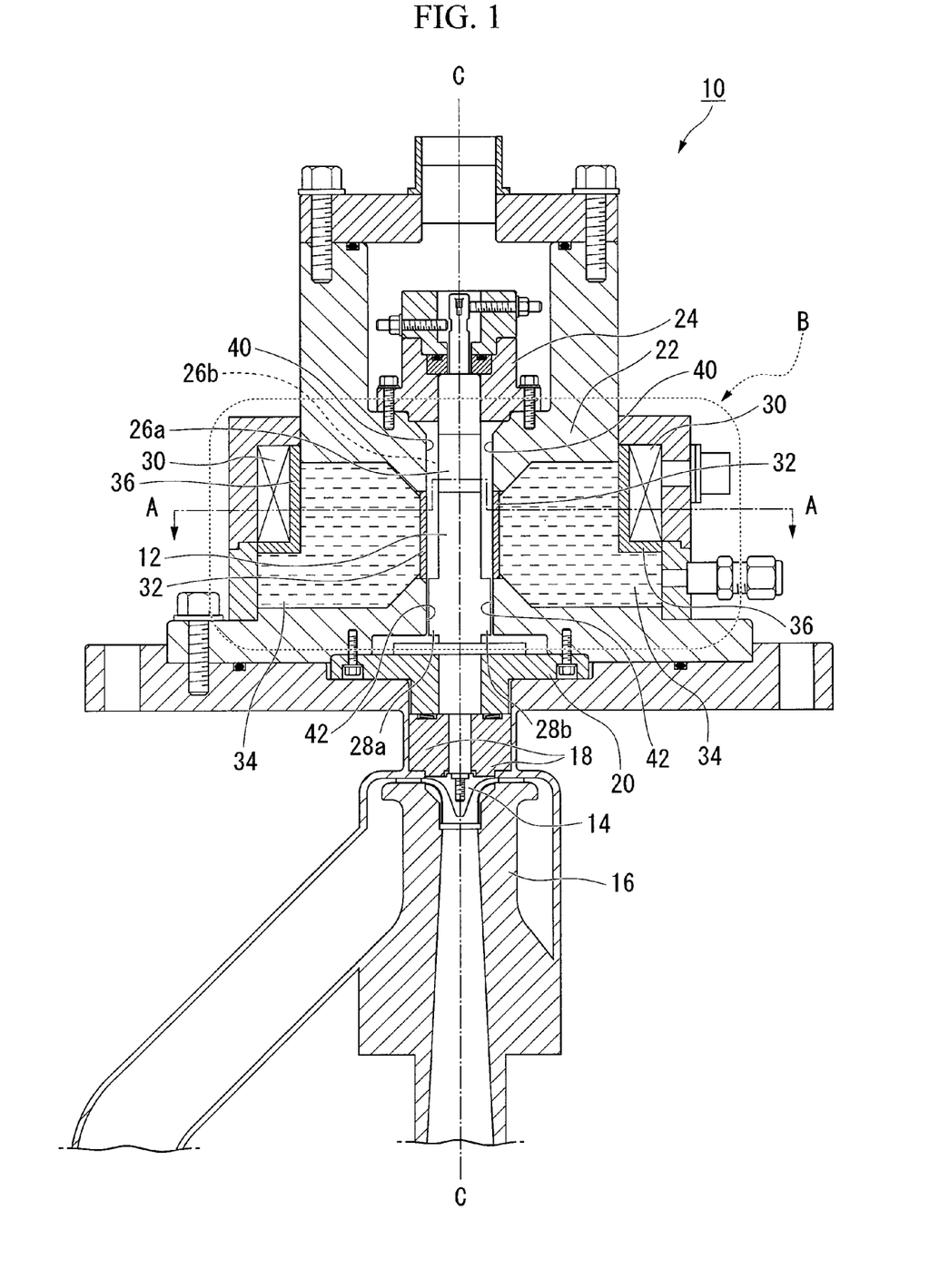
FIG. 1 is a cross-sectional diagram showing the overall structure of an expansion turbine according to a first embodiment.
Figure 2:
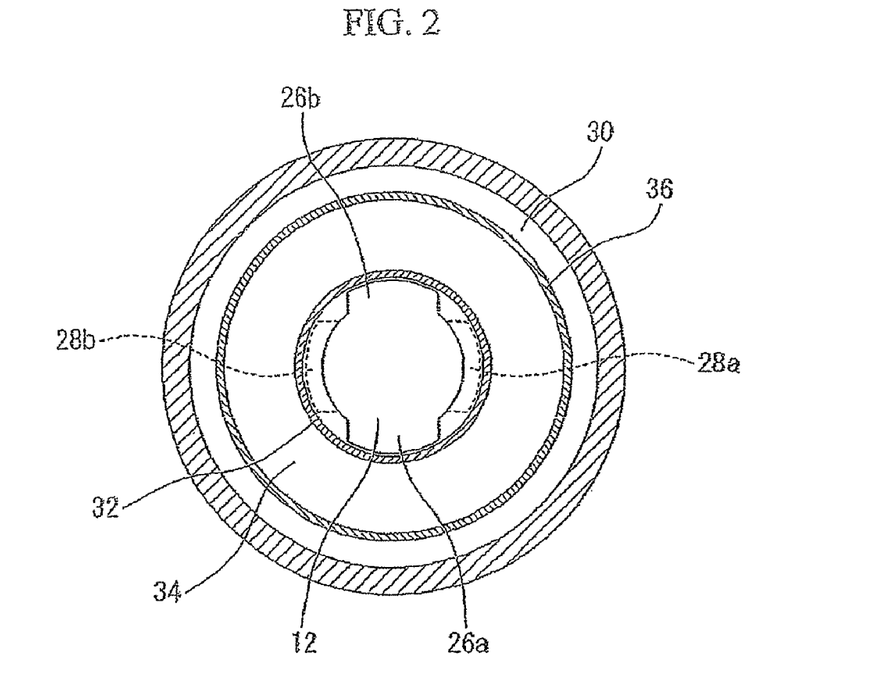
FIG. 2 is a cross-sectional diagram through line A-A of FIG. 1.
Figure 3:
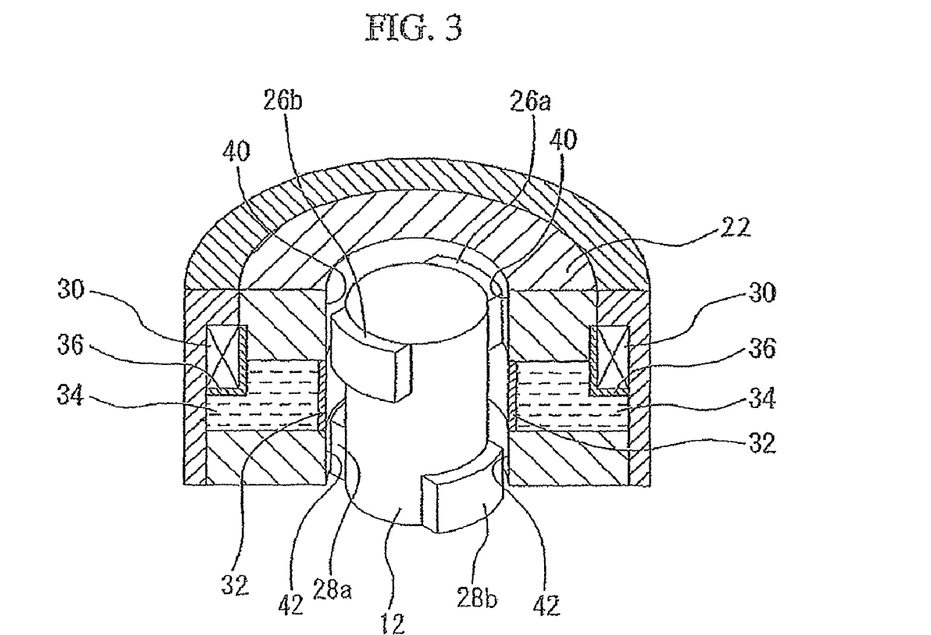
FIG. 3 is a schematic perspective view of part B of FIG. 1.

FIG. 1 is a cross-sectional diagram showing the overall structure of an expansion turbine 10 according to the first embodiment. FIG. 2 is a cross-sectional diagram along line A-A of FIG. 1. FIG. 3 is a schematic perspective view of part B of FIG. 1.

As shown in FIG. 1, the expansion turbine 10 is provided with a rotating shaft 12 made of magnetic material, which extends upwards and downwards, and a turbine impeller 14 provided at the bottom end of the rotating shaft 12. The turbine impeller 14 is incorporated in an adiabatic expansion apparatus 16, and by rotating the turbine impeller 14 when ultra low temperature gas (for example, gas with a temperature of 4 to 64 K) introduced in the adiabatic expansion apparatus 16 is adiabatically expanded, the rotating shaft 12 rotates around a central axis C via the turbine impeller 14.

An insulating material 18 is provided around the rotating shaft 12 on the upper end of the turbine impeller 14, and prevents heat from entering from the end where the rotating shaft 12 is located to the lower temperature side where the turbine impeller 14 is located. A lower end bearing 20 that rotatably supports the lower part of the rotating shaft 12 is provided on the upper end of the insulating material 18. A casing 22 made of an electrically conductive magnetic material is located on the upper end of the lower end bearing 20 coaxially with the central axis C such that it surrounds the outer periphery of the rotating shaft 12. An upper end bearing 24 that rotatably supports the upper end of the rotating shaft 12 is provided on the upper end of the casing 22.

In the axial direction approximately central trunk part of the rotating shaft 12, which is interposed between the upper end bearing 24 and the lower end bearing 20, upper end salient poles 26a and 26b and lower end salient poles 28a and 28b are formed for example alternately such that they are staggered in the direction of the axis of rotation of the rotating shaft 12, that is, the vertical direction.

As shown in FIGS. 2 and 3, the upper end salient poles 26a and 26b are formed as protrusions towards the outside in two opposite places on the outer periphery of the region at the upper end (the end distant from the turbine impeller 14) of the rotating shaft 12. The lower end salient poles 28a and 28b are formed as protrusions towards the outside in two places on the outer periphery of the region at the lower end (the end close to the turbine impeller 14) of the rotating shaft 12, whose locations are shifted by 90 degrees from the center of the upper end salient poles 26a and 26b about the central axis C.

In this manner, salient poles are provided at the upper end and the lower end on the outer peripheral surface of the rotating shaft 12 as magnetic parts for each creating a difference in magnetic resistance in the circumferential direction.

An excitation coil 30 is provided outside of the casing 22 coaxially with the central axis C. The excitation coil 30 is used to create a magnetic path that links the upper end salient poles 26a and 26b and the upper end surface 40 of the inner periphery of the casing 22 located facing them, and also to create a magnetic path that links the lower end salient poles 28a and 28b and the lower end surface 42 of the inner periphery of the casing 22 located facing them. A sealing part 36 formed by a nonmagnetic material such as JIS SUS 304 is provided around the excitation coil 30.

A thin cylindrical sleeve 32 made of a nonmagnetic material is provided coaxially with the central axis C on the inner peripheral side of the casing 22 facing the outer peripheral surface of the rotating shaft 12 between the upper end salient poles 26a and 26b and the lower end salient poles 28a and 28b.

A cooling water path 34 is provided inside the casing 22 on the outer peripheral side of the sleeve 32. The cooling water path 34 is formed in a cavity enclosed by the casing 22, the sleeve 32 on the inner peripheral side of the casing 22, and the sealing section 36 on the outside of the casing 22, forming a cooling function whereby the casing 22 is cooled by the water circulated through the cooling water path 34 by a pump, for example (not illustrated). The sealing section 36 is provided in order to prevent the excitation coil 30 from making contact with the cooling water in the cooling water path 34 and the gas.

Here is a description of the operation of the above-described structure.

When a current is supplied through the excitation coil 30, the excitation coil 30 generates a magnetic field, and a flow of magnetic flux is created in a path connecting for example the interior of the casing 22, the inner peripheral upper end surface 40 of the casing 22, the upper end salient pole 26a, the rotating shaft 12, the lower end salient pole 28a, the inner peripheral lower end surface 42 of the casing 22, and the interior of the casing 22.

When the rotating shaft 12 rotates in this state, the direction of the magnetic flux surrounding the rotating shaft 12 in which the upper end salient pole 26a is provided changes accompanying the rotation, as does the direction of the magnetic flux in the surroundings of the rotating shaft 12 in which the lower end salient pole 28a is provided.

By so doing, a state in which the density of the magnetic flux changes moment by moment is created on both surfaces of the inner peripheral upper end surface 40 and the inner peripheral lower end surface 42 of the casing 22, and eddy currents are generated in the upper end surface 40 and lower end surface 42 of the casing 22 by electromagnetic induction effects. By the generation of these eddy currents, a braking force is generated in the rotating shaft 12 in the opposite direction to the direction of rotation.

Here, since the eddy currents are generated on the inner peripheral upper end surface 40 and the lower end surface 42 of the casing 22, little heat due to electrical loss is generated on the rotating shaft 12 side. As a result, it is possible to maintain the rotational stability of the rotating shaft 12.

Furthermore, heat generated in the inner peripheral upper end surface 40 and the lower end surface 42 of the casing 22 can be exhausted easily by the cooling water flowing through the cooling water path 34 provided inside the casing 22.

Moreover, by locating the upper end salient poles 26a and 26b and the lower end salient poles 28a and 28b alternately such that they are staggered in the vertical direction, that is the direction of the axis of rotation, it is possible to form a construction in which the balance as a rotator of the rotating shaft 21 is not disturbed, and it is possible to create a difference in magnetic resistance in the circumferential direction in the outer periphery of both of the top and bottom of the rotating shaft 12.

In the first embodiment, the excitation coil 30 is on the outer diameter side of the sleeve 32 and the cooling water path 34, and it is provided in a location separated from the ultra low temperature gas and the cooling water. That is, the sealing part 36 is provided on the boundary between the excitation coil 30 and the cooling water path 34, and separates the excitation coil 30 from the cooling water and the ultra low temperature gas. In this manner, since the excitation coil 30 makes contact with neither the cooling water nor the ultra low temperature gas, special measures are not necessary, which makes it possible to use a coil manufactured from common materials.

In this manner, the excitation coil 30 is separated from the ultra low temperature gas and the cooling water path 34 via the sealing part 36 such that it is located on the outer diameter side of the casing 22, where it does not make contact with the ultra low temperature gas or the cooling water. Therefore, there is no need to use special connectors such as hermetic connectors or the like when electrical components such as the excitation coil 30 or the like are installed, so normal connectors can be used. This makes it easy to perform maintenance such as the exchange and inspection of the excitation coil 30.

In the first embodiment, a magnetic field by a direct current can be used for the magnetic path formed by the excitation coil 30. In this manner, by supplying a direct current, it is possible to create a magnetic path in the same direction, and exert a continuous braking force on the rotating shaft 12. Furthermore, the braking force acting on the rotating shaft 12 increases accompanying an increase in the magnitude of the eddy currents, within a range in which the applied magnetic flux is not magnetically saturated. As a result, the braking force acting on the rotating shaft 12 increases according to an increase in any of the values of the number of rotations of the rotating shaft 12, the value of the current applied to the excitation coil 30, and the number of turns on the excitation coil 30. Accordingly, it is possible to change the braking force depending on the number of rotations of the rotating shaft 12 and the value of the current applied to the excitation coil 30.

Moreover, in the first embodiment, a device (not illustrated) for controlling the direct current may be provided outside the excitation coil 30. The arrangement may be such that by turning the current on and off by this device, and variably controlling the amplitude of the direct current applied to the excitation coil 30, the braking force of the expansion turbine 10 can be turned on and off and the size of the braking force can be variably controlled.

Furthermore, in the first embodiment, in order to keep the value of the current applied to the excitation coil 30 low, a construction may be used in which the number of turns on the excitation coil 30 is increased. In this manner, if it is constructed such that the number of turns on the excitation coil 30 is increased in order to reduce the value of the current applied, there is an advantage from the point that the capacity of the current source for applying current to the excitation coil 30 is low.

Moreover, in the first embodiment, the eddy currents are generated on the casing 22 side, which creates a situation in which currents only flow on its surface due to the skin effect, from the viewpoint of electrical theory. As a result, heat is always generated on the upper end surface 40 and the lower end surface 42 of the casing 22. Furthermore, the heat generated on the surfaces 40 and 42 is exhausted by the cooling water flowing through the cooling water path 34 which is provided inside of the casing 22.

Here, in order to absorb the heat from the surfaces 40 and 42 efficiently, the inner walls of the cooling water path 34 formed near the surfaces 40 and 42 are both formed in a tapered shape in which they are tapered towards the sleeve 32 from the casing 22. As a result, since the inner walls of the cooling water path 34 are formed such that they approach the vicinities of the upper end surface 40 and lower end surface 42, the heat from the surfaces 40 and 42 can be exhausted efficiently.

Furthermore, in the first embodiment, it is preferable to form the salient poles 26a, 26b, 28a and 28b integral with the rotating shaft 12. As a material for the salient poles, a material that transmits magnetism, such as JIS SUS 430, can be used.

As described above, the expansion turbine 10 according to the first embodiment has a construction in which a rotating shaft 12 on which the salient pole 26a and the like are formed is provided, an excitation coil 30 is located in the casing 22, and cooling water is used. Since it is a simple construction in which the rotating shaft 12 can be braked easily by only supplying current through the excitation coil 30, the system reliability is higher than when using a conventional braking method and the like, which rely on the generation of electrical energy.

Moreover, the expansion turbine 10 according to the first embodiment has a simple construction whereby it is only necessary to apply direct current to the excitation coil 30, and it is only necessary to exhaust water and supply water in order to exhaust the heat from the cooling water flowing through the cooling water path 34. As a result, little heat is generated accompanying the eddy currents in the rotating shaft 12, which rotates at high speed. Therefore, it is possible to brake the rotation while maintaining the rigidity as a rotator, which is an advantage.

Furthermore, the expansion turbine 10 according to the first embodiment can accept a slight difference in shape provided it has the salient pole 26a and the like formed on the rotating shaft 12, and furthermore, it is provided with the casing 22 outside, which forms a magnetic path. Therefore, structurally, it demonstrates an advantageous effect that the rotating shaft 12 can be braked using a simple structure.

Figure 4:
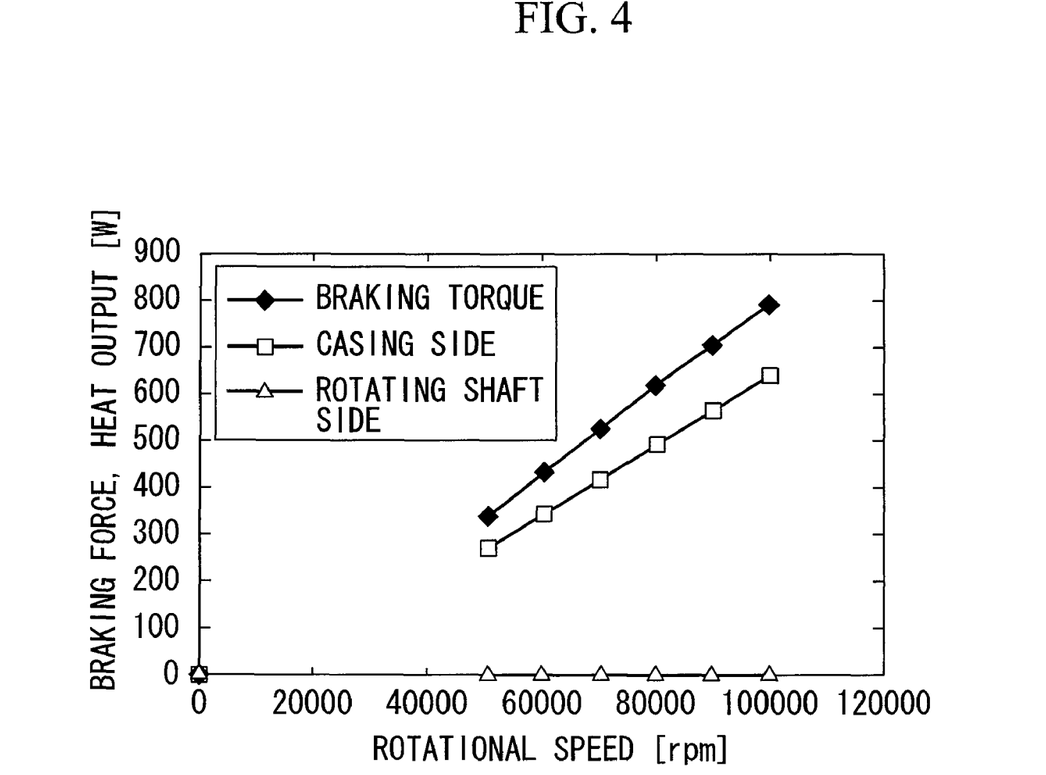
FIG. 4 is an example of the results of an analysis of the performance of an eddy current braking mechanism, which shows the relationships between rotational speed, braking torque, and heat output.

FIG. 4 shows an example of the results of an electromagnetic analysis of the expansion turbine 10 according to the first embodiment. This is a diagram showing an example of the braking torque and the amount of heat generated in the casing 22 in the case where a current of 3 amps is applied to the excitation coil 30, and the results are analyzed with respect to rotational speeds of the rotating shaft 12 of 50000 to 100000 rpm. According to this, in the case where the rotational speed is 50000 rpm, for example, the braking torque is approximately 320 watts when converted to a value of electrical power, the amount of heat generated on the casing 22 side is approximately 270 watts, and the amount of heat generated on the rotating shaft 12 side is almost zero. Furthermore, it shows that in the case where the rotational speed is 100000 rpm, the braking torque is approximately 800 watts when converted to a value of power, the amount of heat generated on the casing 22 side is approximately 640 watts, and the amount of heat generated on the rotating shaft 12 side is almost zero.

In this manner, as the rotational speed increases, the amount of braking torque and heat generated on the casing 22 side increases, and the amount of heat generated on the rotating shaft 12 side does not change even when the rotational speed changes.

As a result, in the expansion turbine 10 according to the first embodiment, by only applying a current, even if the rotational speed increases, the braking force increases incrementally according to the speed, so that it can always continue to apply the braking force.

In the first embodiment, the arrangement may be such that instead of providing salient poles in two places at each of the upper and lower ends close to and distant from the turbine impeller 14, such as the upper end salient poles 26a and 26b and the lower end salient poles 28a and 28b, by providing at least one or more salient poles as magnetic parts at each of the top and the bottom, a difference in magnetic resistance is formed in each of the circumferential direction. Whichever is used, the same effect as in the present invention can be achieved. In this case, it is more preferable that the salient poles are provided in two or more places at each of the top and the bottom in consideration of the stability of the rotating shaft 12 as a rotator.

A second embodiment of an expansion turbine according to the present invention will be described with reference to FIG. 5.

Figure 5:
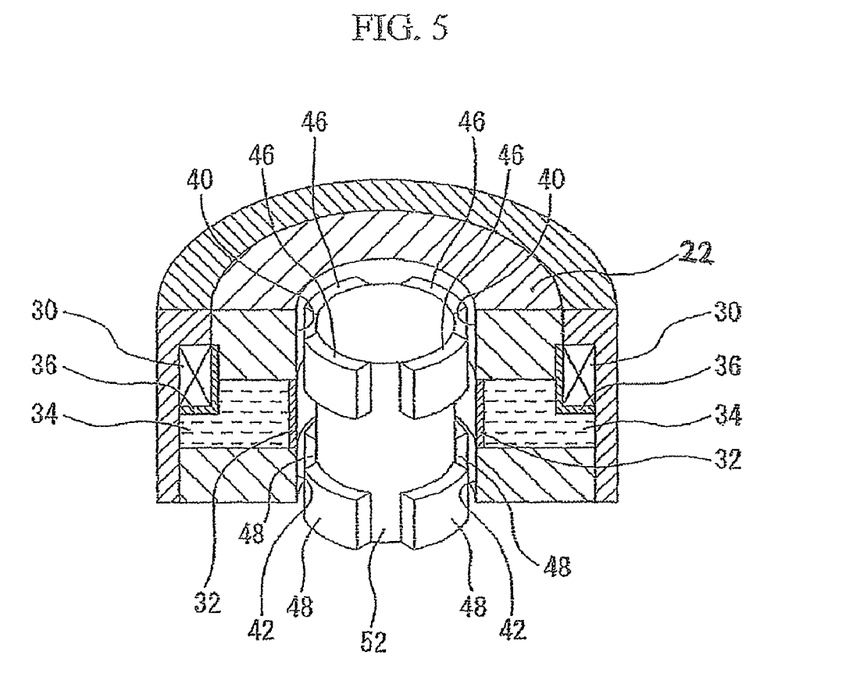
FIG. 5 is a schematic perspective view of an expansion turbine according to a second embodiment, which corresponds with FIG. 3.

FIG. 5 is a schematic perspective view of an expansion turbine according to the second embodiment. As shown in FIG. 5, four upper end salient poles 46 are provided at the upper end (the end distant from the turbine impeller 14) on the outer periphery of a rotating shaft 52 with equal spacing in the circumferential direction, and four lower end salient poles 48 are provided at the lower end (the end close to the turbine impeller 14) on the outer periphery. In this case, it is also possible to brake the rotation of the rotating shaft 52 by generating eddy currents on the casing 22 side from the same theory as in the first embodiment. In this case, as shown in FIG. 5, the four salient poles 46 and 48 at both the top and bottom may be arranged such that they are aligned in the vertical direction.

A third embodiment of an expansion turbine according to the present invention will be described with reference to FIG. 6.

Figure 6:
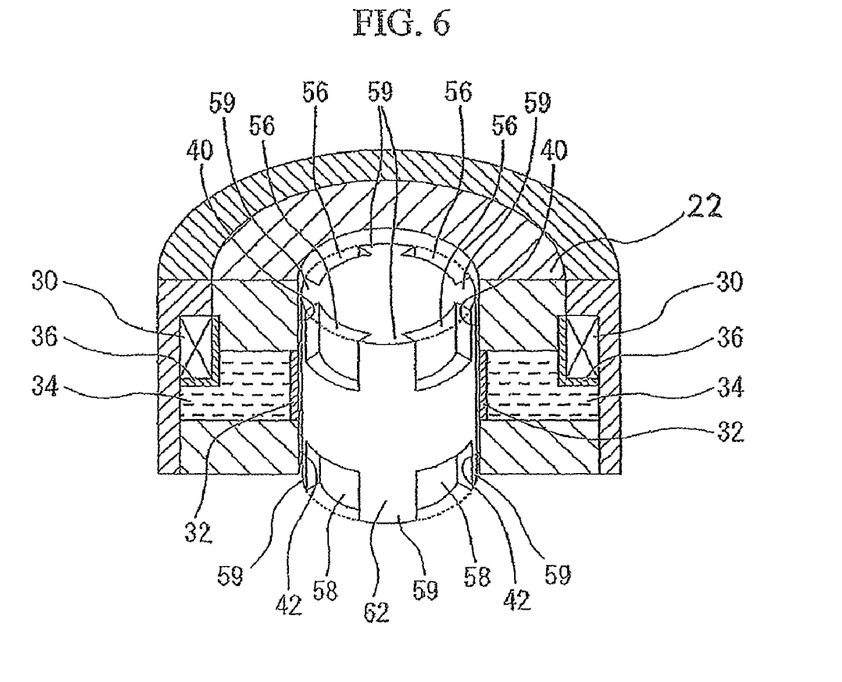
FIG. 6 is a schematic perspective view of an expansion turbine according to a third embodiment, which corresponds with FIG. 3.

FIG. 6 is a schematic perspective view of an expansion turbine according to the third embodiment. As shown in FIG. 6, four upper end indented sections 56, which are indented toward the inside, are provided at the upper end (the end distant from the turbine impeller 14) on the outer periphery of a rotating shaft 62 with equal spacing in the circumferential direction, and four lower end indented sections 58, which are indented toward the inside, are provided at the lower end (the end close to the turbine impeller 14) on the outer periphery. In this case, a difference in magnetic resistance is created in the circumferential direction at the upper end of the rotating shaft 62 by the four upper end indented sections 56, and a difference in magnetic resistance is created in the circumferential direction at the lower end of the rotating shaft 62 by the four lower end indented sections 58. Protruding sections 59 are formed relatively in the parts interposed between the four indented sections at the top and the bottom in the circumferential direction. By the protruding sections 59 playing the roles of magnetic parts, eddy currents are generated on the surface on the casing 22 side facing the indented sections 56 and 58 from the same theory as in the first embodiment, which enables the rotation of the rotating shaft 62 to be braked. In this case, as shown in FIG. 6, the four indented sections 56 and 58 at both the top and bottom may be arranged such that they are aligned in the vertical direction.

The shapes, combinations, operating procedures and the like of each of the constructional elements shown in the first, the second, and the third embodiments are examples. Various changes and modification are possible based on design requirements and the like, provided they do not depart from the gist of the present invention.

What is claimed is:

1. An expansion turbine comprising:
a rotating shaft with a first end and a second end opposite to the first end, and the rotating shaft having an outer periphery;
a turbine impeller positioned on the first end of the rotating shaft;
magnetic parts positioned and configured to create a difference in magnetic resistance in a circumferential direction of the rotating shaft on the outer periphery of said rotating shaft at the first end and the second end of the rotating shaft;
a casing positioned at a location at the outer periphery of said rotating shaft;
a coil positioned outside of the casing, the coil positioned and configured to generate a magnetic flux when a current flows; and
a magnetic path formed by said coil between said casing and said magnetic parts,
wherein said turbine impeller is positioned and configured to rotate when a gas supplied to the turbine impeller is adiabatically expanded,
said magnetic path and the rotation of said rotating shaft are positioned and configured to generate eddy currents in the casing;
a cooling water path is provided in said casing, the cooling water path has an outer diameter substantially the same as the outer diameter of the coil and is positioned and configured to cool said casing by water circulating through said cooling water path, and
said coil is provided outside of said casing separated from said cooling water path by a sealing part made of a nonmagnetic material.

2. An expansion turbine according to claim 1, wherein said magnetic parts comprise salient poles provided on the outer periphery of said rotating shaft at the first end and protruding towards the outside, and salient poles provided on the outer periphery of said rotating shaft at the second end and protruding towards the outside.

3. An expansion turbine according to claim 2, wherein said magnetic parts are two or more magnetic parts located at equal spacing around the circumferential direction of said rotating shaft.

4. An expansion turbine according to claim 3, wherein said magnetic parts are formed alternately such that they are staggered in the direction of an axis of rotation of said rotating shaft.

5. An expansion turbine according to claim 1, wherein said difference in magnetic resistance is created by indented sections indented towards the inside, which are provided on the outer periphery of said rotating shaft at the first and second ends.

6. An expansion turbine according to claim 5, wherein said magnetic parts are two or more magnetic parts located at equal spacing around the circumferential direction of said rotating shaft.

7. An expansion turbine according to claim 6, wherein said magnetic parts are formed alternately such that they are staggered in the direction of an axis of rotation of said rotating shaft.

8. An expansion turbine according to claim 1, wherein said magnetic parts are two or more magnetic parts located at equal spacing around the circumferential direction of said rotating shaft.

9. An expansion turbine according to claim 8, wherein said magnetic parts are formed alternately such that they are staggered in the direction of an axis of rotation of said rotating shaft.

10. An expansion turbine according to claim 1, wherein said magnetic parts are integrated with said rotating shaft.

11. An expansion turbine according to claim 1, wherein said coil is provided in a location separated from the gas.

12. An expansion turbine according to claim 1, wherein said coil is provided in a location separated from the cooling water used for said cooling function.

13. An expansion turbine according to claim 12, wherein:
said magnetic parts are provided close to an inner peripheral surface of said casing;
a thin cylindrical sleeve made of a nonmagnetic material is provided on an inner peripheral side of said casing, which faces an outer peripheral surface of said rotating shaft, between the first and second ends of said rotating shaft, on which said magnetic parts are provided;
said cooling water path is provided on an outer side of said sleeve; and
a magnetic path is created between said casing and said magnetic parts by a direct current supplied through said coil, and eddy currents generated in said casing according to the rotation of said rotating shaft brake said rotating shaft.

14. An expansion turbine according to claim 1, wherein:
said magnetic parts are provided close to an inner peripheral surface of said casing;
a thin cylindrical sleeve made of a nonmagnetic material is provided on an inner peripheral side of said casing, which faces an outer peripheral surface of said rotating shaft, between the first and second ends of said rotating shaft, on which said magnetic parts are provided;
said cooling water path is provided on an outer side of said sleeve; and
a magnetic path is created between said casing and said magnetic parts by direct current supplied through said coil, and eddy currents generated in said casing according to the rotation of said rotating shaft brake said rotating shaft.

\* \* \* \* \*